United States Patent [19]

Parsons

[11] Patent Number: 4,595,081
[45] Date of Patent: Jun. 17, 1986

[54] REVERSIBLE ROTARY ACTUATOR WITH SPRING RETURN

[75] Inventor: Gerald R. Parsons, Poplar Grove, Ill.

[73] Assignee: Barber-Colman Company, Rockford, Ill.

[21] Appl. No.: 648,492

[22] Filed: Sep. 10, 1984

[51] Int. Cl.⁴ .............................................. F03G 1/08
[52] U.S. Cl. .............................. 185/40 R; 251/129.11
[58] Field of Search ..................... 185/40 R; 251/133

[56] References Cited

U.S. PATENT DOCUMENTS

| 2,503,563 | 4/1950 | Ray | 251/133 X |
| 3,137,475 | 6/1964 | Schoenecker et al. | 251/133 X |
| 4,085,345 | 4/1978 | Bullat | 310/117 |
| 4,203,573 | 5/1980 | Boss | 251/133 |
| 4,533,800 | 8/1985 | Parsons | 200/61.39 |

Primary Examiner—Allan D. Herrmann
Attorney, Agent, or Firm—Leydig, Voit & Mayer, Ltd.

[57] ABSTRACT

The output shaft of a rotary actuator is rotated in one direction by an electric motor and is returned in the opposite direction by a spring which is wound during driving of the shaft by the motor. The motor drives the output shaft and winds the return spring by way of a speed-reducing, torque amplifying gear train. To enable the use of a lighter return spring and the use of a gear train effecting greater torque amplification from the motor to the output shaft, intermediate gears in the drive train apply winding torque to the return spring differentially of the drive torque applied to the output shaft.

6 Claims, 8 Drawing Figures

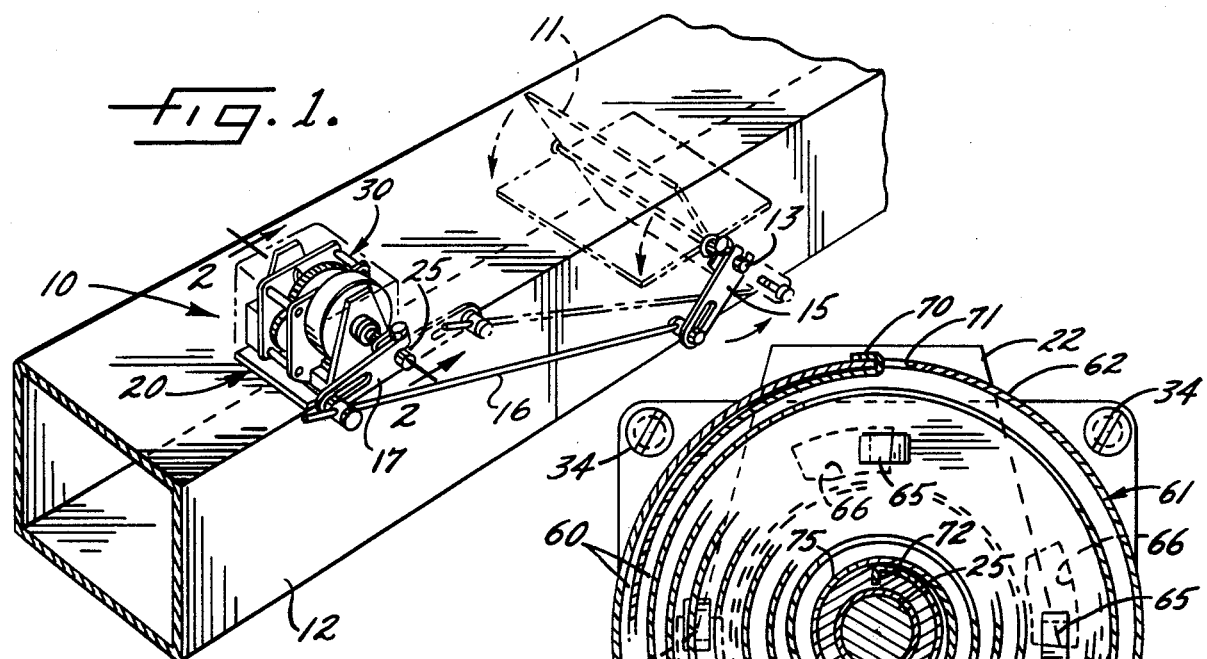
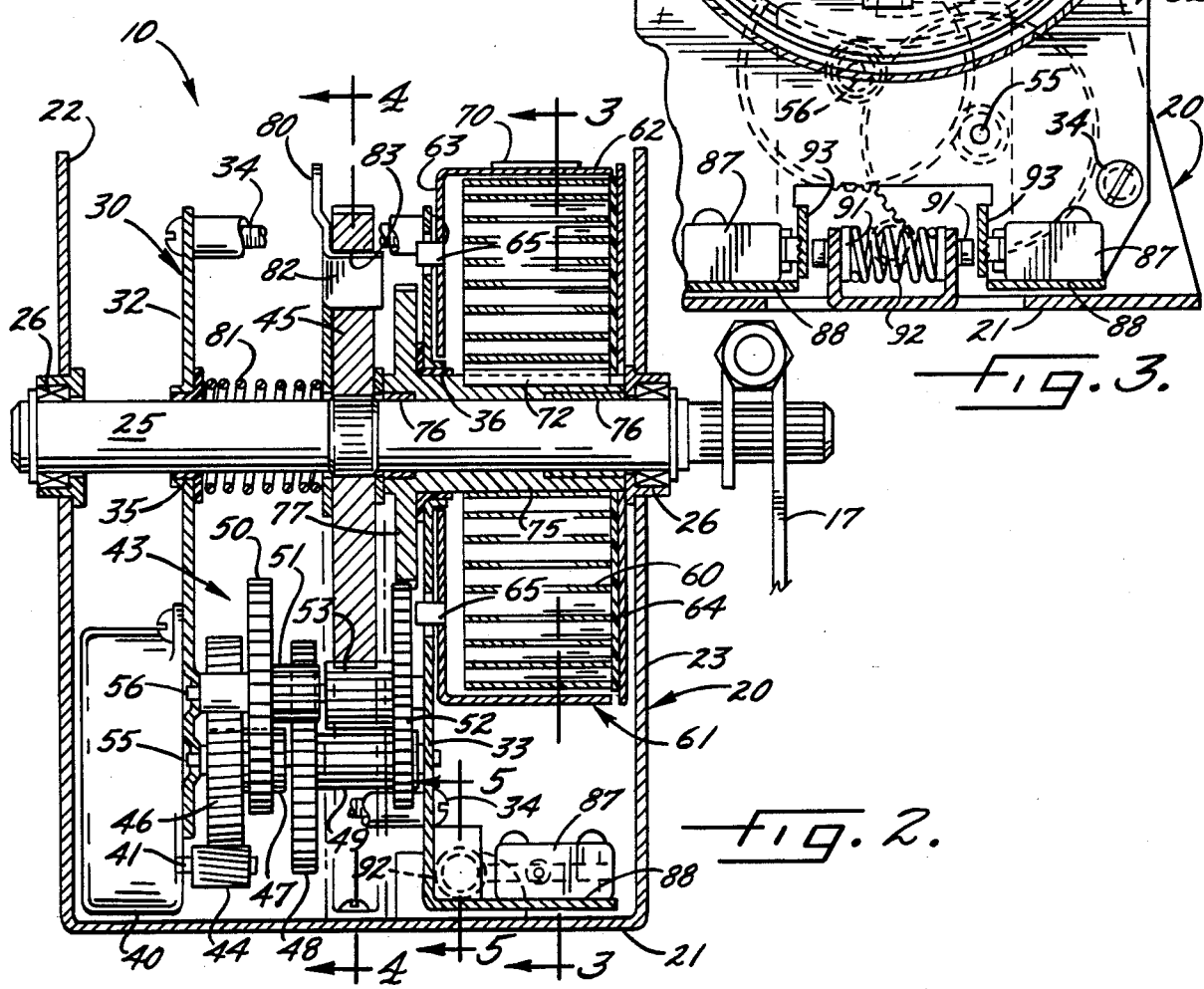

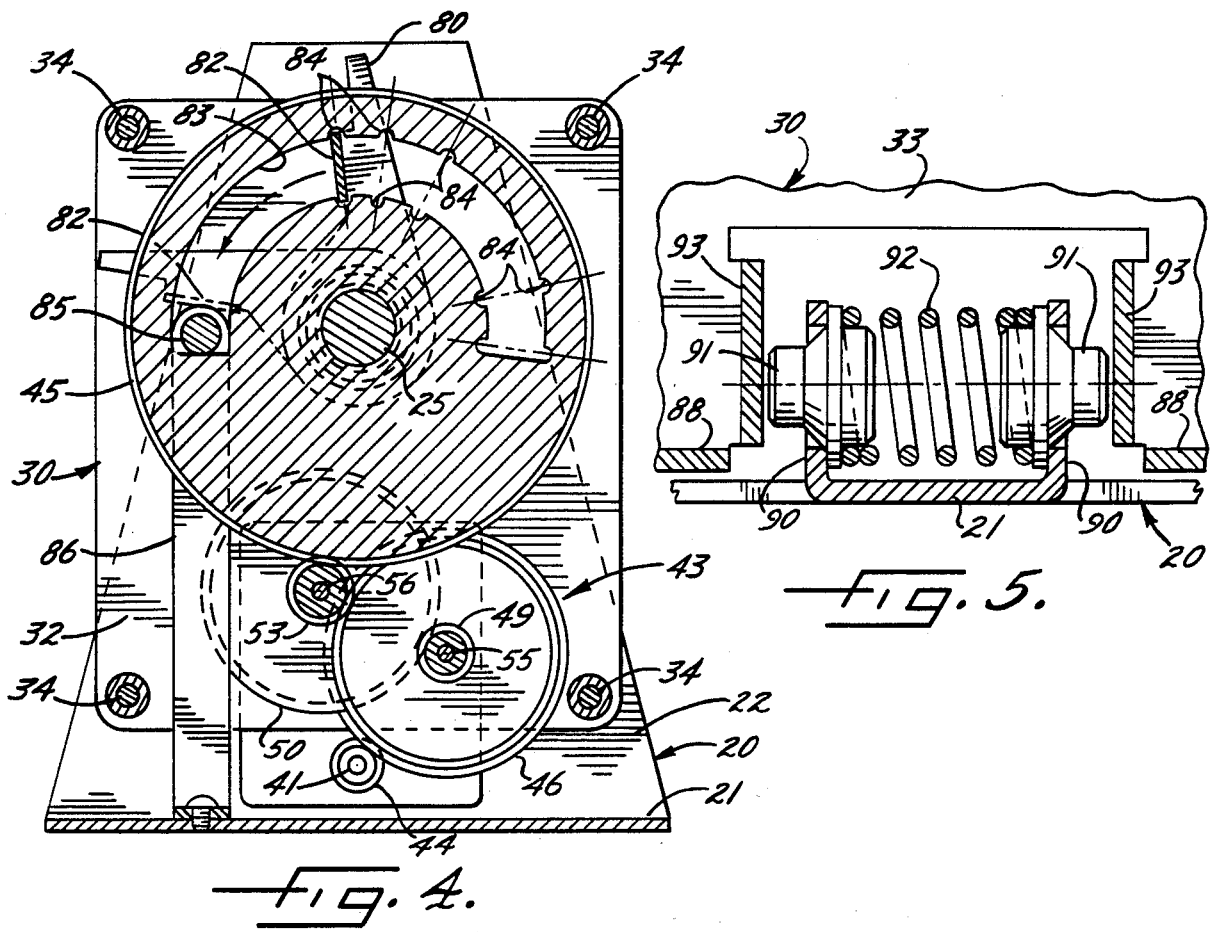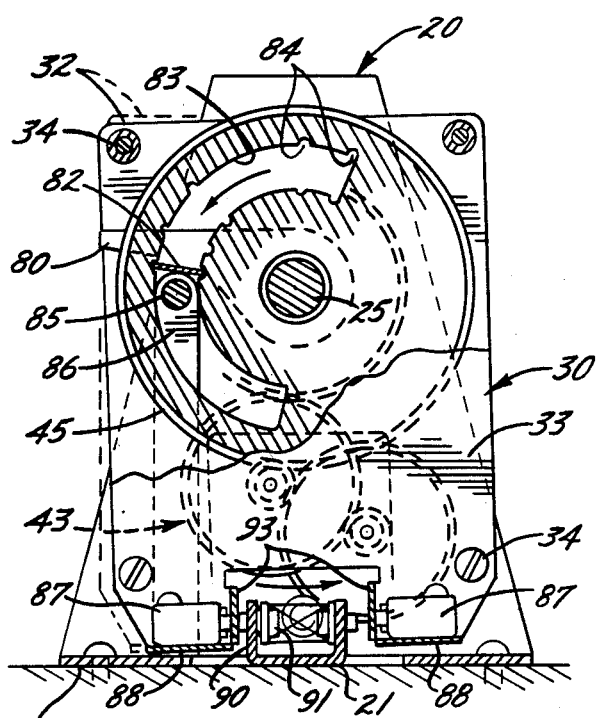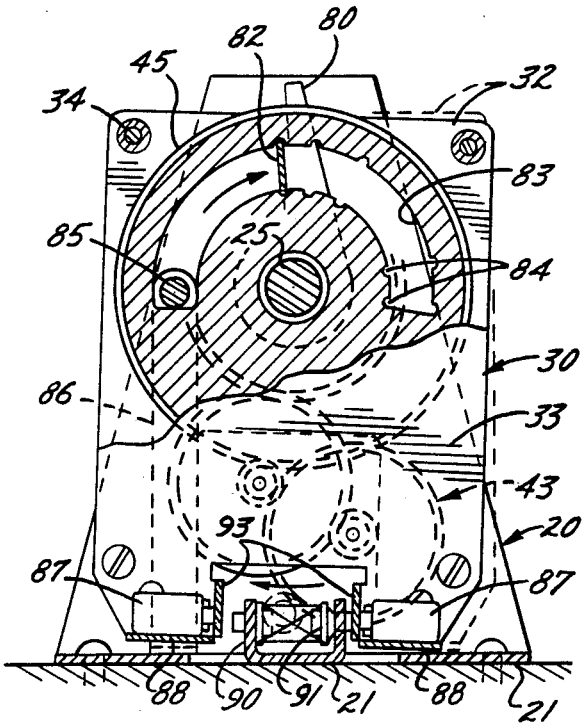

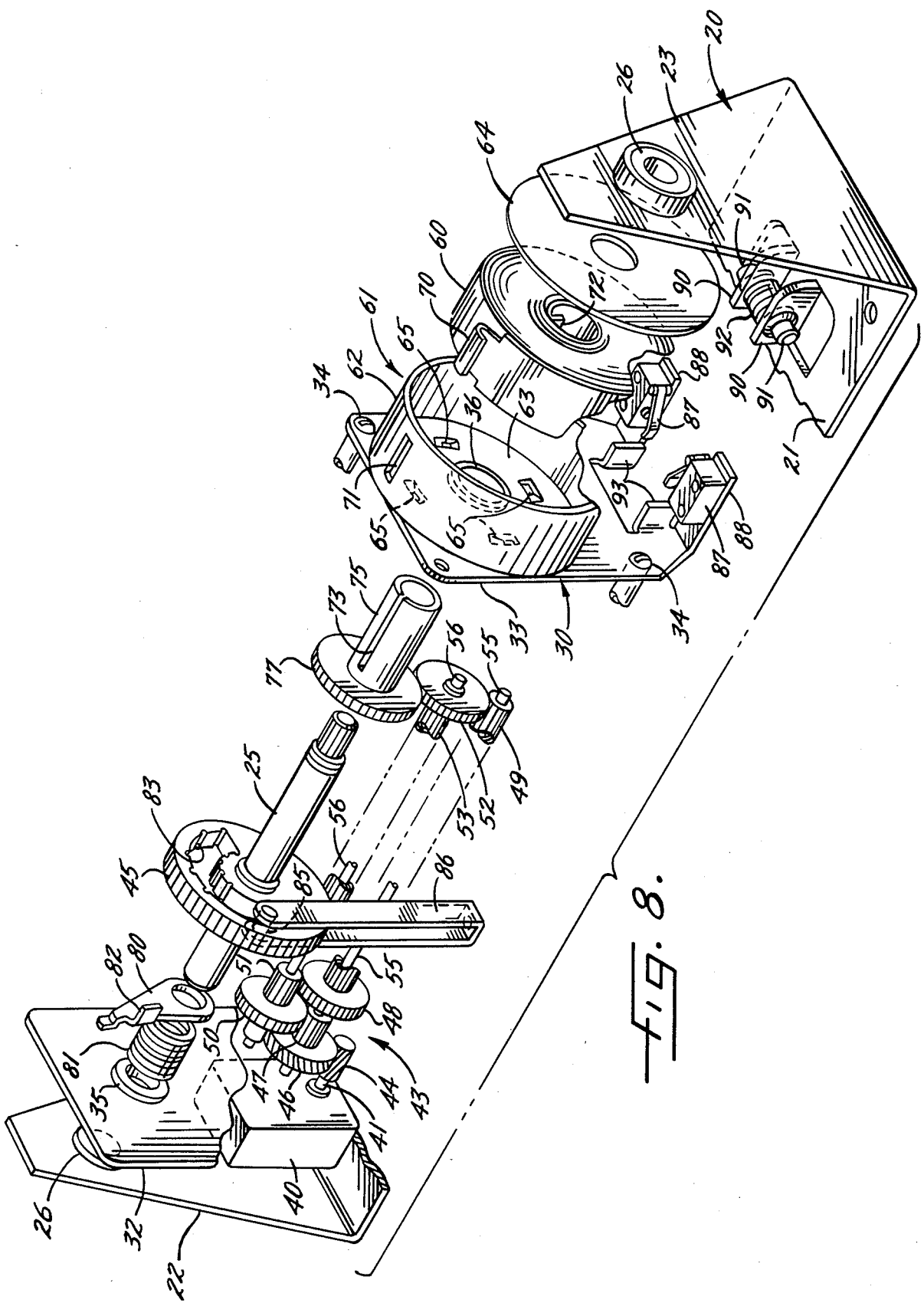

REVERSIBLE ROTARY ACTUATOR WITH SPRING RETURN

BACKGROUND OF THE INVENTION

This invention relates to a reversible rotary actuator having an electric motor which is selectively operable to rotate an output shaft in one direction. During driving of the output shaft by the motor, a torsion spring is wound so as to store energy for rotating the shaft in the other direction when the motor is de-energized and the spring unwinds.

More particularly, the invention relates to a rotary actuator of the type in which the motor rotates the output shaft and winds the spring by way of a gear train which substantially reduces the speed and substantially amplifies the torque of the motor. When the spring unwinds to rotate the output shaft, the spring acts reversely through the gear train and backdrives the motor shaft.

In most prior actuators of the foregoing type, the return spring has acted either directly on the output shaft or on the final drive train gear attached to the drive shaft.

SUMMARY OF THE INVENTION

The general aim of the present invention is to provide a new and improved reversible rotary actuator of the foregoing general type in which the return spring is uniquely arranged so as to enable the use of a substantially lighter spring than has been possible heretofore and, at the same time, to enable practical use of a gear train effecting greater speed reduction and more torque amplification from the motor drive shaft to the output shaft.

A more detailed object is to achieve the foregoing by providing an actuator in which the drive train applies winding torque to the return spring differentially of the torque applied by the drive train to the output shaft and in which the return spring acts through a torque-amplifying section of the gear train in applying return torque to the output shaft while avoiding acting reversely through such section in backdriving the motor.

Still another object is to provide an actuator in which an intermediate gear of the drive train applies winding torque to the spring and then applies return torque to the output shaft when the spring unwinds.

A related object is to conserve space and to provide a compact actuator by use of a unique arrangement which enables the return spring to be located coaxially with the output shaft while being acted upon and while acting through the intermediate gear of the drive train.

These and other objects and advantages of the invention will become more apparent from the following detailed description when taken in conjunction with the accompanying drawings.

BRIEF DESCRIPTION OF THE DRAWINGS

FIG. 1 is a perspective view showing a dampercontrolled air duct equipped with a new and improved reversible rotary actuator incorporating the unique features of the present invention.

FIG. 2 is an enlarged fragmentary cross-section taken substantially along the line 2—2 of FIG. 1.

FIGS. 3 and 4 are fragmentary cross-sections taken substantially along the lines 3—3 and 4—4, respectively, of FIG. 2.

FIG. 5 is an enlarged fragmentary cross-section taken substantially along the line 5—5 of FIG. 2.

FIG. 6 is a view similar to FIG. 4 but on a reduced scale and showing the output shaft of the actuator at one end of its rotary stroke.

FIG. 7 is a view similar to FIG. 6 but shows the output shaft at the other end of its rotary stroke.

FIG. 8 is an exploded perspective view of the actuator.

DETAILED DESCRIPTION OF THE PREFERRED EMBODIMENT

As shown in the drawings for purposes of illustration, the invention is embodied in a reversible rotary actuator 10 for controlling the position of an output member 11. In this particular instance, the output member 11 has been shown as being a flow-controlling damper located in an air conditioning duct 12 and adapted to be turned through approximately 90 degrees between a fully open horizontal position and a fully closed upright position. To support the damper for such turning, a shaft 13 is connected rigidly to the damper and is journaled in the side walls of the duct. One end portion of the shaft extends through the adjacent side wall of the duct and carries a radially extending crank arm 15. The latter is connected by a linkage 16 to a second radially extending crank arm 17 which, when turned through approximately 180 degrees by the actuator 10, acts through the linkage to swing the damper between its fully open and fully closed positions.

The actuator 10 includes a generally U-shaped main mounting base 20 having a lower base plate 21 and two upstanding side plates 22 and 23. The actuator also includes an output shaft 25 rotatably supported by bearings 26 in the side plates and having one end projecting through the side plate 23 and connected securely to the crank arm 17.

As shown in FIG. 2, a sub-base or cage 30 is supported by the output shaft 25 to turn relative to the main base 20 about the axis of the shaft. The cage includes spaced side plates 32 and 33 rigidly connected to one another by screws 34 and formed with holes through which the output shaft extends. A bushing 35 (FIG. 2) supports the plate 32 on the shaft 25 while the plate 33 is supported by a bushing 36.

Driving of the output shaft 25 in one direction (e.g., counterclockwise as viewed in FIGS. 3 and 8) is effected by a small electric motor 40 (FIG. 2) mounted on the side plate 32 of the cage 30. The drive shaft 41 of the motor is connected to the output shaft 25 by a gear train 43 which causes the output shaft to rotate at a substantially slower speed than the motor drive shaft and to be capable of exerting substantially higher torque than the motor drive shaft.

In this instance, the gear train 43 includes a small input gear 44 (FIGS. 2 and 8) rotatable with the motor shaft 41, a large output gear 45 rotatable with the output shaft 25 and eight intermediate gears 46 to 53 in driving relationship with the input and output gears. Intermediate large gear 46 meshes with the input gear 44 and rotates conjointly with intermediate small gear 47 on a pin 55 which extends between the side plates 32 and 33 of the cage 30, the pin also rotatably supporting conjointly rotatable large and small intermediate gears 48 and 49. A second pin 56 extending between the side plates 32 and 33 rotatably supports large and small conjointly rotatable gears 50 and 51 which mesh with the gears 47 and 48, respectively. Also conjointly rotatable on the pin 56 are the two final large and small intermediate gears 52 and 53. The large intermediate gear 52 meshes with the small intermediate gear 49 while the small intermediate gear 53 meshes with the output gear 45. The gear train 43 thus established effects counterclockwise rotation of the output shaft 25 in response to clockwise rotation of the motor shaft 41 and causes the output shaft to rotate at a much slower speed than the motor shaft.

As the output shaft 25 is rotated counterclockwise by the motor 40, winding torque is applied to a torsion spring 60 (FIGS. 2, 3 and 8) so as to store energy for rotating the output shaft in a clockwise direction when the motor is de-energized. Upon such de-energization, the spring unwinds and acts on the output shaft to turn the latter clockwise. In addition, the spring acts through the gear train 43 to backdrive the motor 40.

In accordance with the present invention, winding torque is applied to the return spring 60 by the gear train 43 differentially of the torque applied by the drive train to the output shaft 25. Moreover, the spring acts through the speedreducing gears 53 and 45 to drive the output shaft but bypasses those gears to backdrive the motor 40. As will become more apparent subsequently, this arrangement enables the use of a lighter return spring and enables the use of a gear train 43 effecting a greater speed reduction ratio between the motor drive shaft 41 and the output shaft 45.

While the fundamental principles of the invention could be achieved by locating the return spring 60 coaxially with the intermediate gears 52 and 53, space is conserved and the overall actuator 10 is made more compact by positioning the spring coaxially with the output shaft 25. As shown in FIG. 3, the return spring is in the form of a spiral clock spring having an axis which coincides with the axis of the output shaft. The spring is a "Negator" spring having a low spring rate and capable of providing substantially constant torque. The spring is contained within a cup-shaped housing 61 (FIG. 8) having a circular side wall 62 and a closed back wall 63 and closed by a cover plate 64. The housing 61 is connected to the cage 30 but the cage is permitted to turn through a limited range relative to the housing about the axis of the output shaft 25. For this purpose, the back wall 63 of the housing is formed with four angularly spaced clamping tabs 65 (FIG. 3) which fit through arcuate slots 66 in the plate 33 of the cage 30. The slots are spaced angularly around the axis of the output shaft 25 and receive the tabs with circumferential clearance while still holding the plate 33 and the back wall 63 in secure face-to-face relation. As a result of the tabs and slots, the cage 30 and all components carried by the cage are capable of turning through a limited range relative to the spring housing 61.

The outer tang 70 (FIGS. 3 and 8) of the spring 60 extends through a slot 71 in the circular side wall 62 of the housing 61 and is anchored relative to the housing. In carrying out the invention, the inner tang 72 of the spring is anchored within a slot 73 in a tubular spring drive shaft 75 which is telescoped over and is rotatable relative to the output shaft 25. Thus, as shown in FIG. 2, bushings 76 support the spring drive shaft 75 rotatably on the output shaft 25 so that the spring drive shaft may turn on the output shaft to wind the spring 60.

Formed integrally with one end of the spring drive shaft 75 is a gear 77 which meshes with the intermediate gear 52 and which forms a second output gear of the gear train 43. While the final intermediate gears 52 and 53 of the gear train rotate conjointly, the two output gears 45 and 77 rotate relative to one another. The speed reduction ratio (e.g., 8 to 1) of the final intermediate gear 53 to the output gear 45 on the output shaft 25 is substantially greater than the speed reduction ratio (e.g., 1.3 to 1) of the final intermediate gear 52 to the output gear 77 on the spring drive shaft 75.

With the foregoing arrangement, differential torque is applied to the output shaft 25 and to the return spring 60 when the motor 40 is energized to drive the output shaft in a counterclockwise direction. Thus, the output shaft is driven by virtue of the final intermediate gear 53 acting on the output gear 45 to effect a substantial speed reduction and a substantial amplification of torque. In contrast, the final intermediate gear 52 acts on the spring drive shaft 75 through the output gear 77 to rotate the spring drive shaft at a substantially greater speed than the output shaft and with substantially less torque. Thus, a lighter return spring 60 may be used since the spring need not sustain the high torque applied to the output shaft.

Even though a relative light return spring 60 may be used, the spring is fully capable of applying the necessary return torque to the output shaft 25 and of overcoming the backdriving resistance of the gear train 43 when the motor 40 is de-energized. When the spring unwinds, it drives the ouput shaft 25 by way of the output gear 77, the final intermediate gear 52, the final intermediate gear 53 and the output gear 45. The torque applied by the spring is amplified substantially by the final intermediate gear 53 and the output gear 45 and thus a smaller spring can apply substantially more torque to the output shaft 25 than would be the case if the spring acted directly on the output shaft or the output gear 45. Moreover, the spring backdrives the motor shaft 41 by way of the output gear 75 and the intermediate gears 52 and 49 thus removing the gears 53 and 45 from the backdriving path and avoiding the need of overcoming the torque-reducing effect otherwise created by the large gear 45 driving the smaller gear 53 if those gears were in the backdriving path. By virtue of the foregoing, a gear train 43 with a greater speed reducing and torque amplifying ratio can be established between the motor drive shaft 41 and the output shaft 25. For example, in a conventional actuator where the spring backdrives the motor through a gear corresponding to the output gear 45, the speed-reducing ratio from the motor shaft to the output shaft cannot be larger than approximately 1,000 to 1 in order to enable the size of the return spring to be kept within practical limits. In contrast, a speed-reducing ratio of about 6,000 to 1 can be established with the present actuator 10 as a result of driving the spring 60 by means of the intermediate gear 52 and the separate output gear 77.

The actuator 10 includes means for limiting the rotary stroke of the output shaft 25 and for enabling the angular length of the stroke of the output shaft to be quickly and easily adjusted. Herein, these means comprise an arm 80 mounted loosely on the output shaft 25 adjacent one side of the output gear 45 and biased toward the output gear by a coil spring 81 telescoped over the output shaft and compressed between the arm and the bushing 35. A finger 82 formed integrally with the outer end portion of the arm projects into a slot 83 formed through the gear and extending through an angle of about 180 degrees. Several pairs of angularly spaced detent notches 84 (FIG. 4) are formed in opposing sides of the slot and are adapted to receive the finger.

A stop pin 85 extends through the slot 83 in the gear 45 and is supported rigidly by a U-shaped bracket 86 anchored to and extending upwardly from the lower plate 21 of the base 20. After the output shaft 25 has rotated counterclockwise through a predetermined distance, the finger 82 engages the upper side of the pin 85 and prevents further counterclockwise rotation of the shaft (see FIG. 6). Similarly, one end of the slot engages the lower side of the pin as shown in FIG. 7 to limit clockwise rotation of the shaft. By sliding the arm 80 on the shaft and away from the gear 45, the finger 82 may be withdrawn from the slot 83. The arm then may be turned on the shaft to enable the finger to be placed in a different set of notches 84 to change the limit of the stroke.

Means also are provided for producing electrical signals when the output shaft 25 reaches the ends of its rotary stroke. These means comprise a pair of electrical switches 87 mounted on ears 88 extending from the lower end of the side plate 33 of the cage 30. The switches straddle a pair of ears 90 (FIGS. 5 and 8) upstanding from the lower plate 21 of the base 20 and slidably supporting a pair of plungers 91 which are urged away from one another by a strong compression spring 92. The plungers are adapted to engage a pair of lugs 93 projecting from the side plate 33 of the cage 30 and normally prevent the cage from rotating relative to the base about the axis of the output shaft 25. When rotation of the output shaft 25 is stopped by the pin 85, the spring 92 yields to allow the cage 30 to rotate either counterclockwise (FIG. 6) or clockwise (FIG. 7) relative to the base 20 and to cause an appropriate one of the switches 87 to be actuated by the adjacent ear 90. For a more detailed description of the manner of actuating the switches, reference may be made to Parsons U.S. Pat. No. 4,533,800.

I claim:

1. A reversible actuator comprising a rotatable output shaft, a selectively energizable electric motor having a rotatable drive shaft for rotating said output shaft in one direction when said motor is energized, a gear train having an input gear rotatable with said motor drive shaft and having an output gear rotatable with said output shaft, said gear train including intermediate gear means disposed in driving relationship with said input and output gears, sand torsion spring means operably connected to said intermediate gear means and wound in response to rotation of said intermediate gear means and differentially of torque applied by said intermediate gear means to said output shaft when said motor is energized to rotate said output shaft in said one direction, said spring means unwinding and applying torque to said output shaft through said intermediate gear means to rotate said output shaft in the opposite direction upon de-energization of said motor, a spring drive shaft connected to said spring means to wind said spring means when rotated in one direction and to rotate in the other direction when said spring means unwinds, said spring means winding and unwinding about an axis coinciding with the axis of said spring drive shaft, said gear train further including a second output gear rotatable with said spring drive shaft and rotatable relative to said first output gear, said intermediate gear means including first and second conjointly rotatable intermediate gears disposed in driving relationship with said first and second output gears, respectively, the ratio of said first intermediate gear to said first output gear being different than the ratio of said second intermediate gear to said second output gear.

2. A reversible actuator comprising a rotatable output shaft, a selectively energizable electric motor having a rotatable drive shaft for rotating said output shaft in one direction when said motor is energized, a torsion spring adapted to be wound when said output shaft is rotated in said one direction and adapted to unwind and rotate said output shaft in the opposite direction upon de-energization of said motor, a spring drive shaft connected to said spring and rotatable in one direction to wind said spring and in the other direction as said spring unwinds, a speed reducing gear train having an input gear connected to be rotated by said motor drive shaft, said gear train having first and second separately rotatable output gears connected to and rotatable with said output shaft and said spring drive shaft, respectively, and said gear train including first and second conjointly rotatable intermediate gears in driving relationship with said first and second output gears, respectively, and driven conjointly in one direction by said motor drive shaft when said motor is energized and conjointly in the opposite direction by said spring drive shaft when said spring unwinds, the speed reduction ratio of said first intermediate gear to said first output gear being greater than the speed reduction ratio of said second intermediate gear to said second output gear whereby said output shaft rotates at a lower speed than said spring shaft when said motor is energized and when said spring unwinds.

3. A reversible actuator as defined in claim 2 in which said spring drive shaft is coaxial with and is rotatable relative to said output shaft.

4. A reversible actuator as defined in claim 3 in which said spring drive shaft is telescoped with said output shaft.

5. A reversible actuator as defined in claim 4 in which said spring winds and unwinds about an axis coinciding with the axis of said spring drive shaft.

6. A reversible actuator comprising a rotatable output shaft, a selectively energizable electric motor having a rotatable drive shaft for rotating said output shaft in one direction when said motor is energized, a torsion spring adapted to be wound when said output shaft is rotated in said one direction and adapted to unwind and rotate said output shaft in the opposite direction upon de-energization of said motor, said spring winding and unwinding about an axis coinciding with the axis of said output shaft, a spring drive shaft telescoped over and rotatable relative to said output shaft and connected to said spring so as to rotate in one direction to wind said spring and in the other direction as said spring unwinds, a speed reducing gear train having an input gear connected to be rotated by said motor drive shaft, said gear train having first and second output gears connected to and rotatable with said output shaft and said spring drive shaft, respectively, and said gear train including first and second conjointly rotatable intermediate gears in driving relationship with said first and second output gears, respectively, and driven conjointly in one direction by said motor drive shaft when said motor is energized and conjointly in the opposite direction by said spring drive shaft when said spring unwinds, the speed reduction ratio of said first intermediate gear to said first output gear being greater than the speed reduction ratio of said second intermediate gear to said second output gear whereby said output shaft rotates at a lower speed than said spring shaft when said motor is energized and when said spring unwinds.

* * * * *